Aug. 25, 1959  F. L. DAVIS  2,901,204
LITTER BRACKETS

Filed Jan. 11, 1957  7 Sheets-Sheet 1

INVENTOR.
FRANK L. DAVIS
BY
*Philip S. M*Bean
ATTORNEY

Aug. 25, 1959 F. L. DAVIS 2,901,204
LITTER BRACKETS
Filed Jan. 11, 1957 7 Sheets-Sheet 2
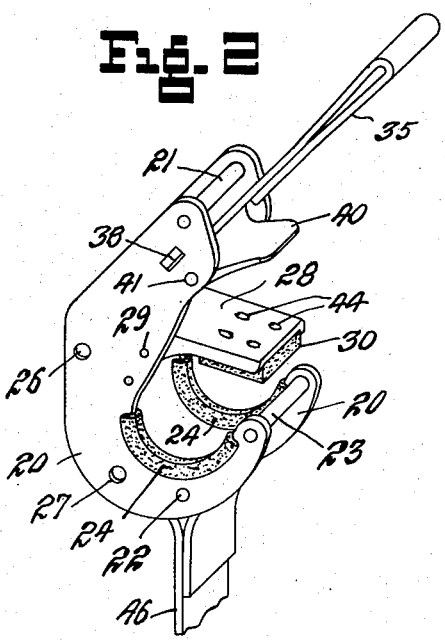
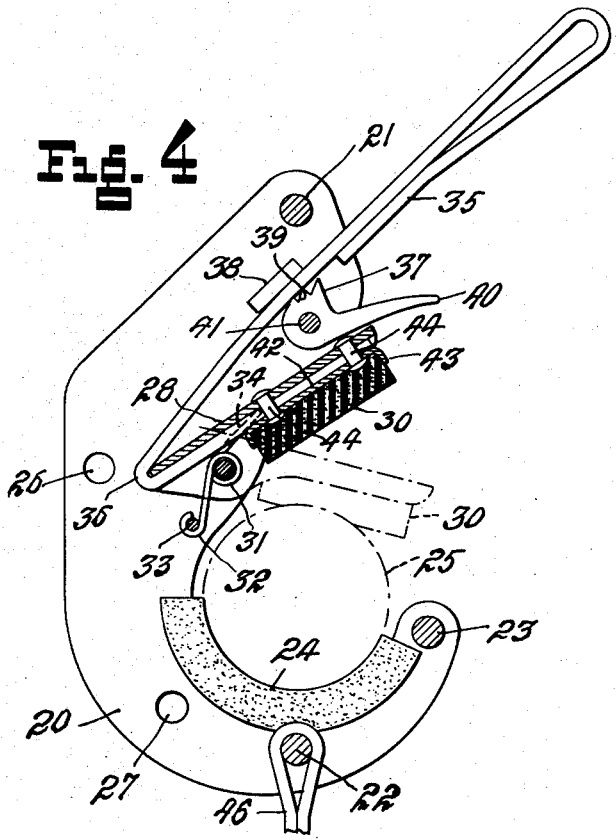
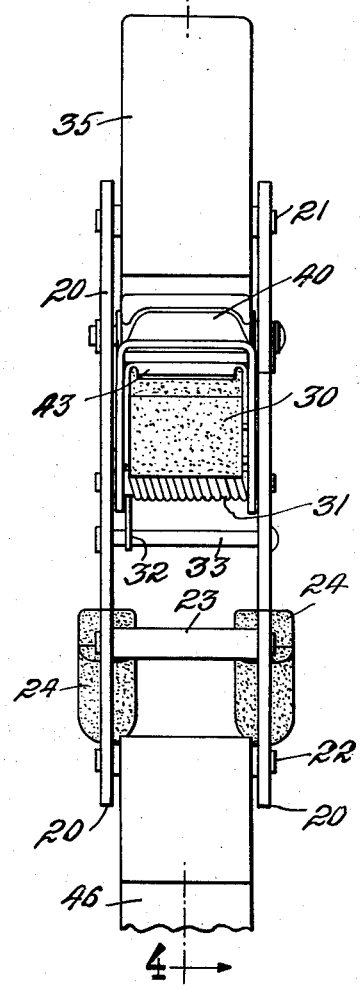
INVENTOR.
FRANK L. DAVIS
BY
ATTORNEY Aug. 25, 1959 F. L. DAVIS 2,901,204
LITTER BRACKETS
Filed Jan. 11, 1957 7 Sheets-Sheet 3
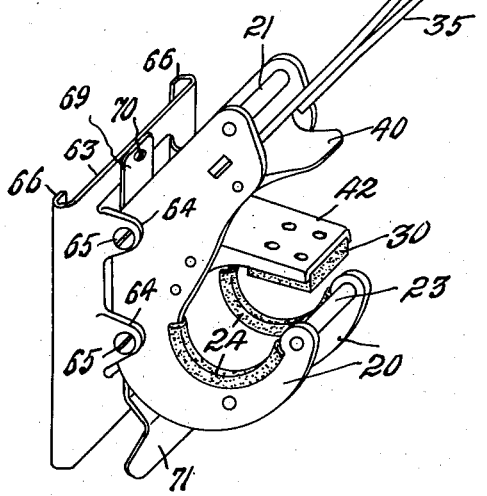
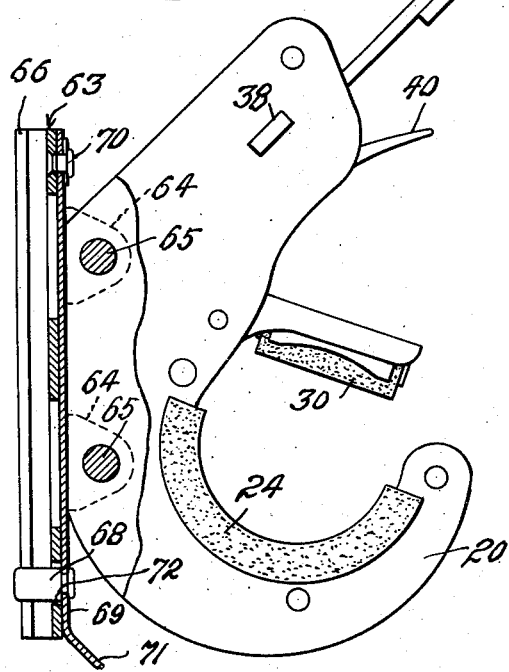
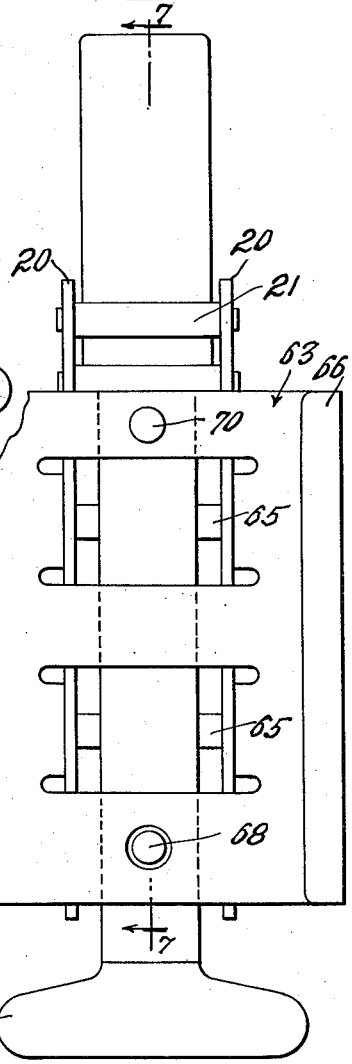
INVENTOR.
FRANK L. DAVIS
BY
ATTORNEY Aug. 25, 1959 F. L. DAVIS 2,901,204
LITTER BRACKETS
Filed Jan. 11, 1957 7 Sheets-Sheet 4
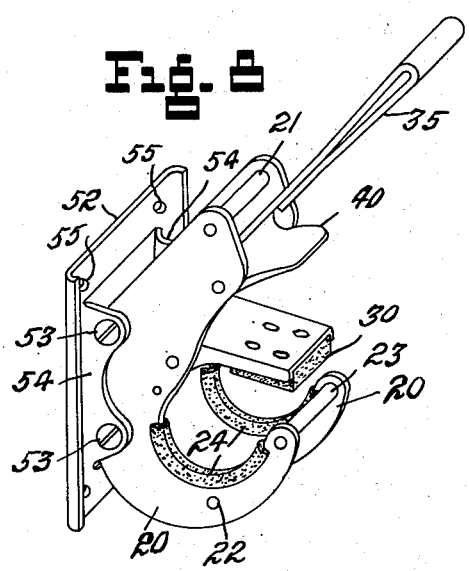
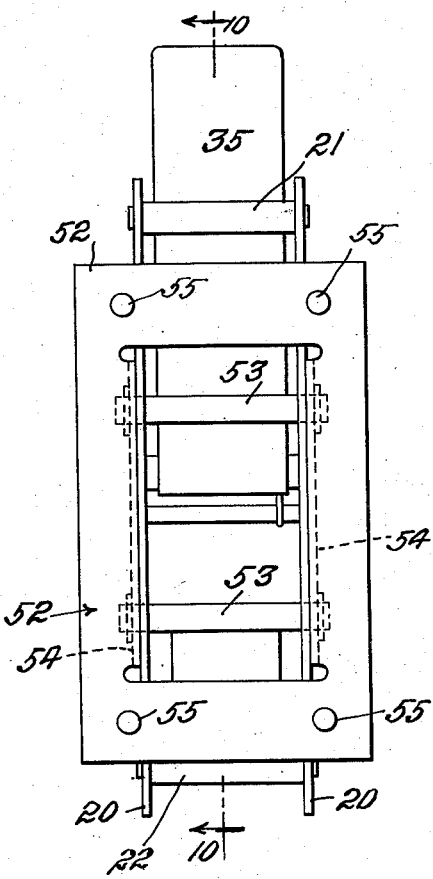
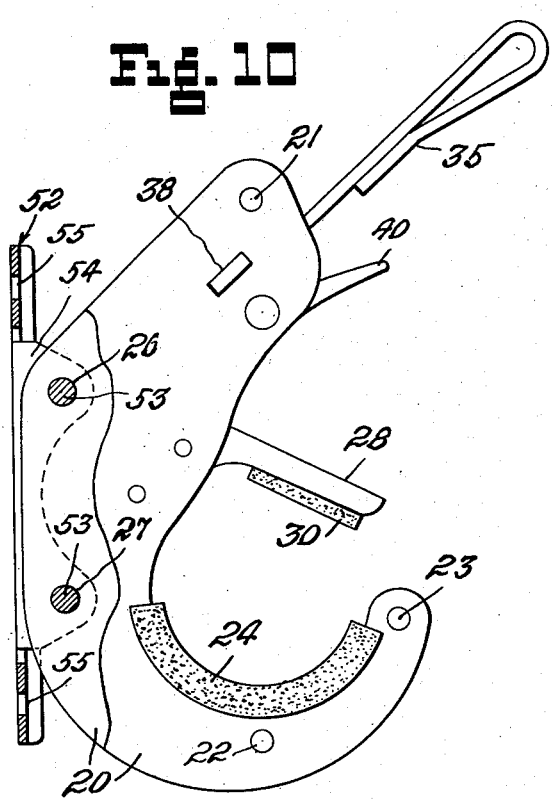
INVENTOR.
FRANK L. DAVIS
BY
ATTORNEY Aug. 25, 1959 F. L. DAVIS 2,901,204
LITTER BRACKETS
Filed Jan. 11, 1957 7 Sheets-Sheet 5
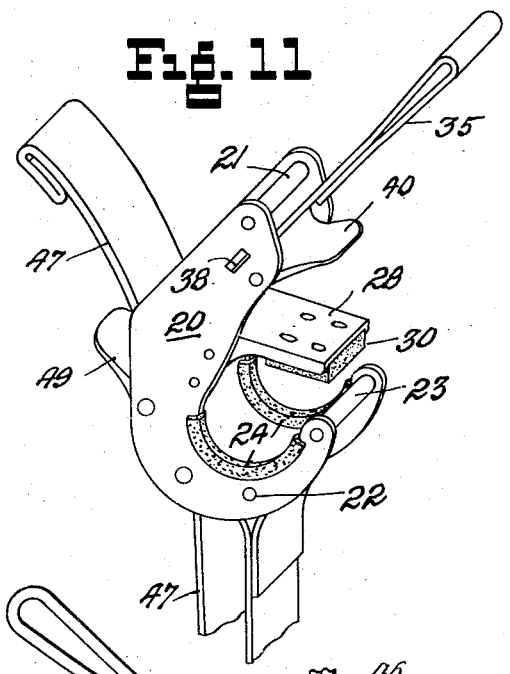
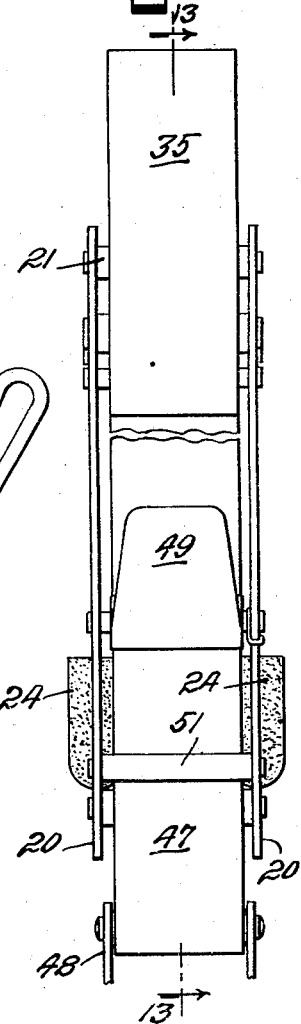
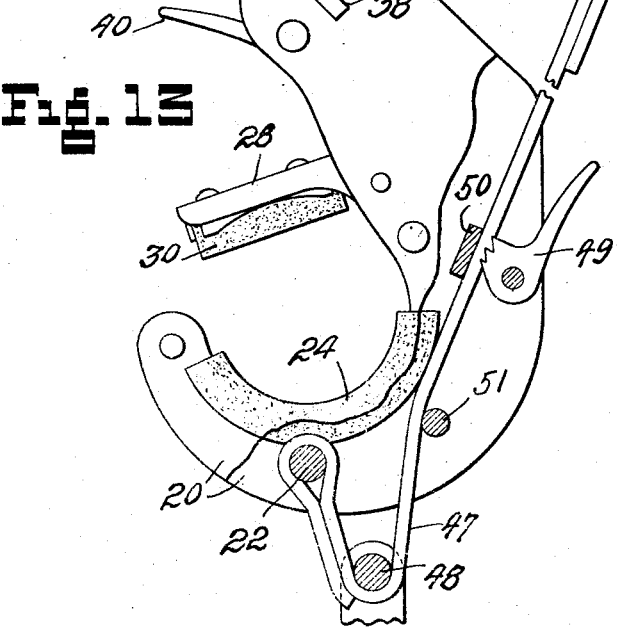
INVENTOR.
FRANK L. DAVIS
BY
ATTORNEY Aug. 25, 1959     F. L. DAVIS     2,901,204
LITTER BRACKETS
Filed Jan. 11, 1957     7 Sheets-Sheet 6
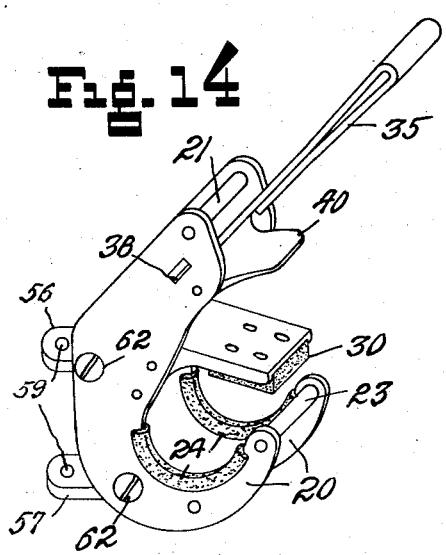
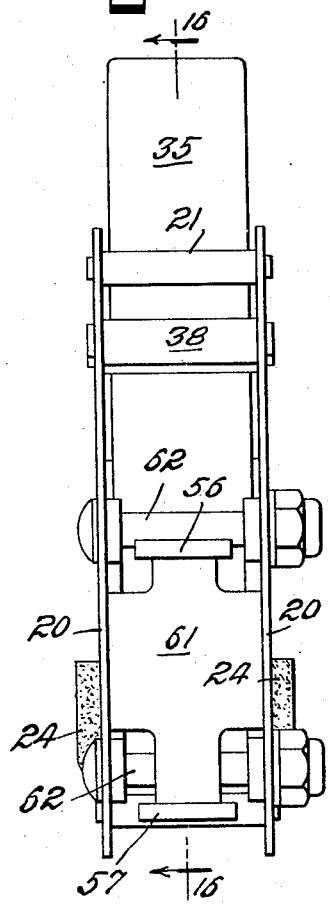
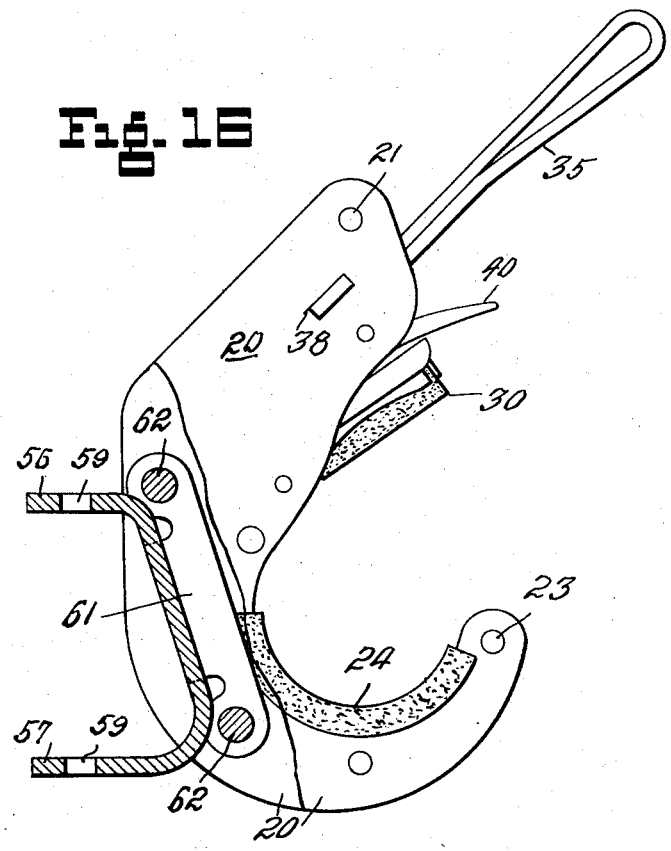
INVENTOR.
FRANK L. DAVIS
BY
ATTORNEY

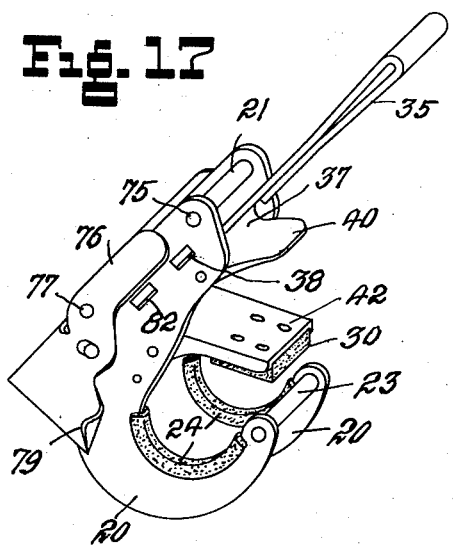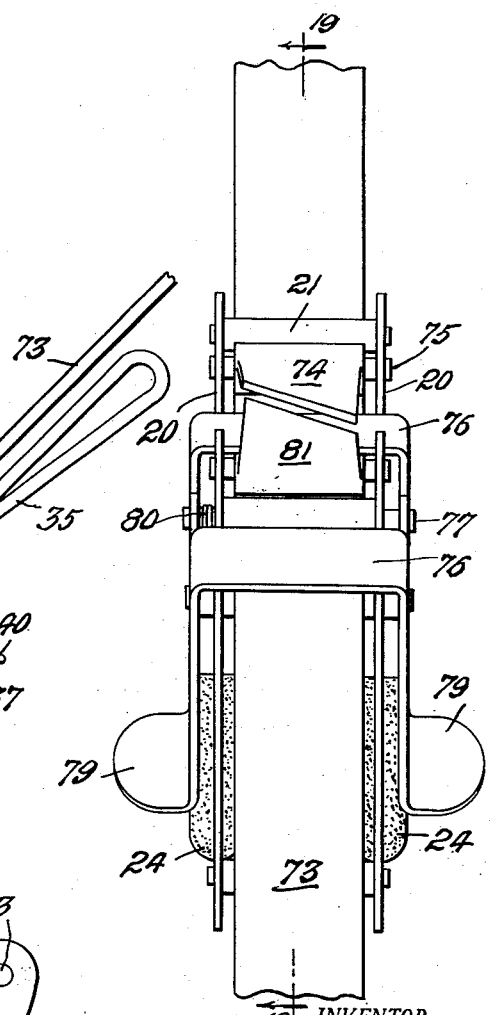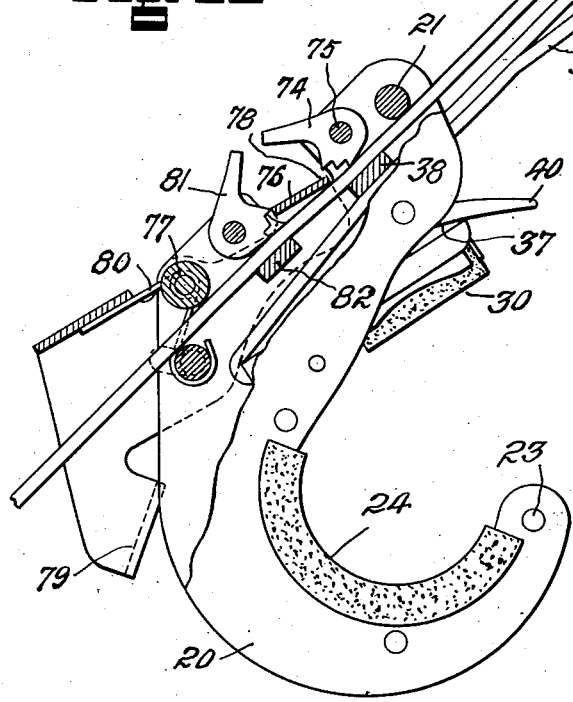

United States Patent Office 2,901,204
Patented Aug. 25, 1959

2,901,204

LITTER BRACKETS

Frank Louis Davis, College Point, N.Y.

Application January 11, 1957, Serial No. 633,610

2 Claims. (Cl. 248—229)

The invention here disclosed relates to the supporting of litters, particularly in airplanes, ships and other conveyances where it is necessary or desirable to superpose or stack the litters in tiers.

Objects of the invention are to provide supporting structure to which the litters may be quickly applied and securely held and which will be operable as well to quickly release the litters.

Special objects are to provide such equipment in forms readily attachable in different ways to walls or to other supporting structures.

Further special objects are to provide these litter supports in the form of special brackets which may be mounted adjustably or in fixed relation to suit different requirements and surroundings.

Other objects of the invention are to accomplish all the foregoing and other purposes with relatively simple, inexpensive, readily manufactured forms of construction.

The foregoing and other desirable objects are attained by novel features of construction, combinations and relations of parts, all as hereinafter described and illustrated by way of example in the accompanying drawings.

The drawings referred to constitute part of the following specification and while illustrating generally preferred forms, it will be appreciated that structure may be modified and changed, all within the true intent and scope of the invention as hereinafter defined and claimed.

Fig. 1 in the drawings is a fragmentary, diagrammatic and partly sectional composite view showing different forms of the brackets as mounted in an airplane or similar conveyance.

Fig. 2 is a perspective view of one of the web suspended, non-adjustable litter brackets like those in the second vertical row shown in Fig. 1.

Fig. 3 is a front view of the bracket shown in Fig. 2 with the bottom web broken away.

Fig. 4 is a vertical sectional view of this bracket on substantially the plane of line 4—4 of Fig. 3.

Figure 1:
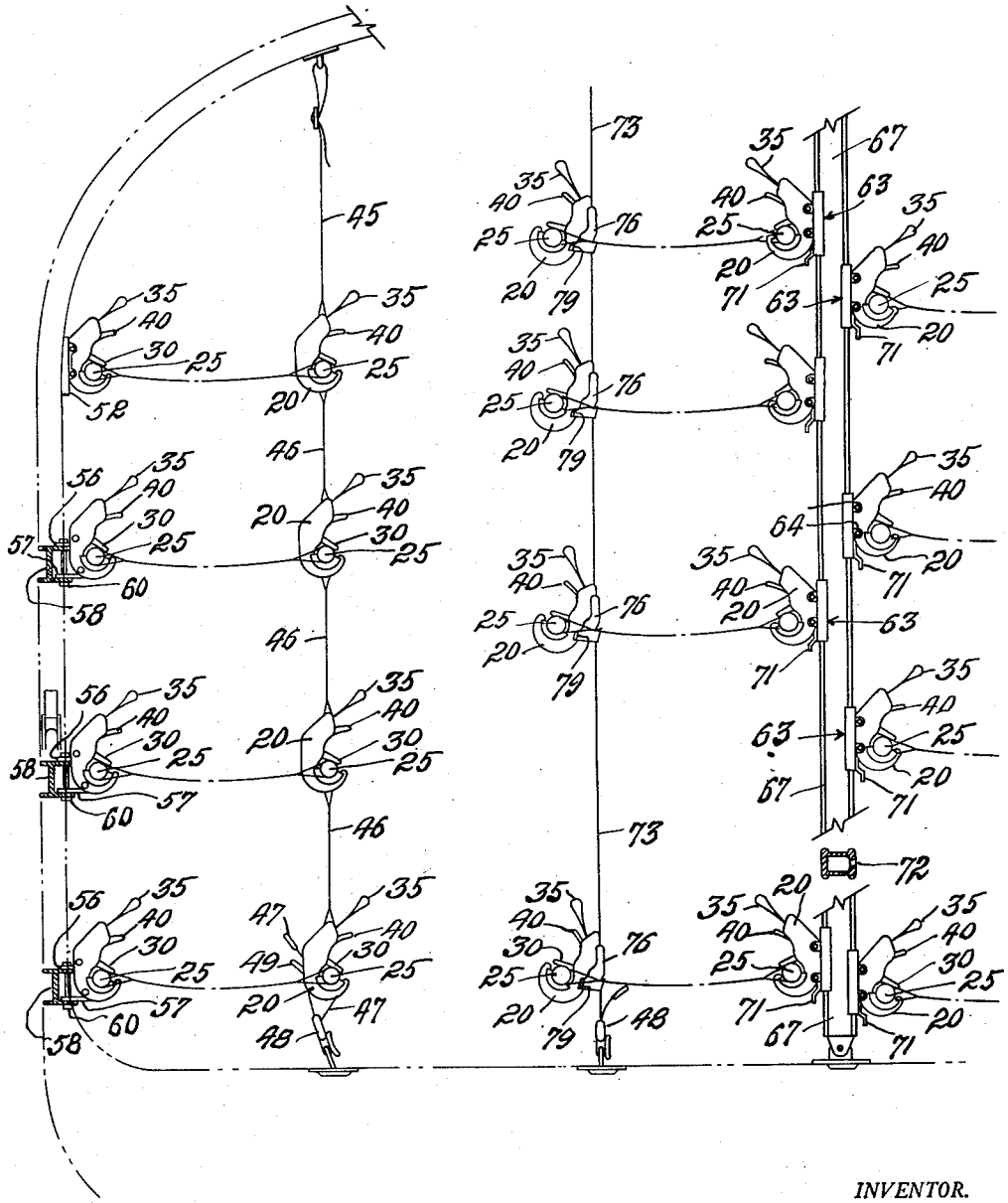

Figs. 5, 6 and 7 are perspective, back and vertical sectional views, similar to Figs. 2, 3 and 4, of the vertically adjustable stanchion type of litter bracket appearing at the right in Fig. 1; the sectional view Fig. 7 taken on substantially the plane of line 7—7 of Fig. 6.

Figs. 8, 9 and 10 are similar perspective, back and sectional views of the fixed wall type of bracket appearing at the upper left in Fig. 1.

Figs. 11, 12 and 13 are similar views of the bottom litter bracket in the second vertical row in Fig. 1.

Figs. 14, 15 and 16 are like views of the wall swivelled type of bracket shown at the lower left in Fig. 1.

Figs. 17, 18 and 19 are perspective, back and broken sectional views of a web supported vertically adjustable form of the bracket.

The several forms of the invention illustrated are alike in that they consist in each case of an upwardly faced open hook designed to receive and snugly hold a litter handle and a clamp which can be closed over the handle by one movement or released by a different movement. The differences between the several forms are particularly in the manner of mounting the brackets.

The hook members are shown as made up of companion hook shaped plates 20, 20 secured in spaced parallel relation by riveted, welded, or otherwise secured studs 21, 22, 23, Figs. 2, 3 and 4.

The open hook forming portions of these members are shown as faced with resilient cushioning and gripping material 24, such as rubber, leather or the like, shaped to smoothly receive the handle of the litter indicated at 25.

This provides a light strong construction designed to firmly hold the litter. The spacer pins or studs provide means for in some instances supporting and staying the bracket.

Additionally, the hook plates are shown as having openings 26, 27, Figs. 2 and 4, in the back and lower portions of the same which may be used when the brackets are to be attached to wall fittings.

The clamp for holding the litter handle is shown in Fig. 4 as an inverted channel-shaped lever 28 pivoted between the hook plates on the cross pin 29 and carrying a pad 30 of rubber, leather or like material to engage over and grip the handle.

This gripping lever is located above the open hook structure in position where it can be swung upward clear of the hook and it is normally urged to this latter position by a spring 31 coiled about the pivot pin and caught at one end at 32 to a cross pin 33 and engaged at the opposite end 34 against the underside of the channel-shaped lever.

Downward gripping movement of the lever is effected by a pull strap 35 secured within the channel of the lever and carried upward around the lower end of the lever at 36 beneath a securing cam 37 cooperating with a cross bar 38 secured between the hook plates. This strap or web holding cam is preferably spring tensioned in the gripping direction so that it will automatically take hold and secure the web in the upward clamp closing direction of movement.

The cam may be cross corrugated as shown at 39 or otherwise constructed to securely grip the web and it is shown as having a finger engageable extension 40 by which it may be released.

The cam and the pad 38 against which the cam holds the web are located in the upper neck portion of the hook above the clamp lever, leaving the hook free and unobstructed, so as not to interfere with insertion or removal of the litter handle. In this position above the clamp lever the cam may serve as a stop limiting the upward swinging movement of such lever. The pivotal mounting for the cam is shown as a cross pin 41 secured between the plates.

A practical and convenient mounting for the clamp pad 30 and anchorage for the end of the pull strap is shown in Fig. 4 as a plate 42 having upturned or flanged edges 43 holding the pad and said plate being secured within the channel of the clamp lever over the end of the web by through rivets 44.

When the brackets are to be suspended from overhead structure such as in the second column of Fig. 1, a supporting web 45 may be engaged with the top cross pin 21 and webbing 46 for staying the upper bracket and suspending the lower bracket or brackets may be engaged with the lower cross pin 22.

At the bottom, the row of inboard brackets may be steadied and held by webbing 47 looped at the end about bottom pin 22 of the lowermost bracket, Figs. 11, 12 and 13, and extended through a floor ring 48 or the like up between a holding cam 49 and companion pad or plate 50. Upward pull on web 47 will then serve to tighten and hold the entire inner row of litter brackets.

This bottom litter bracket may be the same as previously described with the addition of the extra downholding web 47, cam 49, pad 50 and possibly an extra cross pin 51, Fig. 13, for guiding the loop of web from the floor ring up to the holding cam.

At the outboard side, the upper may be a fixed bracket rigidly secured to the wall structure and the others, swiveled brackets, as shown at the left in Fig. 1.

Figs. 8, 9 and 10 show how fixed brackets may be provided by attaching wall plates 52 over the back of the hook plates by through screws 53, rivet studs or the like extending through flanges 54 of the wall plates and through the fastener openings 26, 27, previously described, in the hook plates.

These wall plates may be suitably fashioned for mounting on a wall structure, they being here illustrated by way of example simply as flat flanged plates having openings 55 for screw, rivet, or other wall fasteners.

The swivel brackets may be made up as shown in Figs. 14, 15 and 16, with swivel fittings having outstanding upper and lower flanges 56, 57 for engagement over flanges of the wall beams 58, Fig. 1, perforated at 59 for the swivel bolts or studs 60 and having angled flanges 61 secured by bolts or studs 62 between the back portions of hook plates 20.

Where the litter brackets are to be mounted on inboard posts or stanchions such as shown at the right in Fig. 1, the brackets may have stanchion plates 63 secured by flanges 64 and through bolts 65 to the side plates of the hooks as shown in Figs. 5, 6 and 7.

These back plates are shown as having inturned flanges 66 to ride over the flanges of the stanchion posts 67 and they are shown as secured in vertically adjusted position on the stanchions by pins 68 carried by flat springs 69 riveted or otherwise secured at 70 to the upper ends of the back plates and having forwardly extended tongues or finger grips 71 at the lower ends by which the lock pins can be lifted out of companion openings 72 in the stanchions. On lifting tongues 71 these brackets may be unlocked and shifted up or down to different positions on the vertical stanchions.

Figs. 17, 18 and 19 illustrate another form of vertically shiftable bracket wherein the upright support is in the nature of a continuous length of flexible webbing 73, instead of a rigid post element. This flexible supporting member 73 is shown in Fig. 1 at the left of stanchion 67.

In such case, the brackets are equipped with suspension cams 74 pivoted at 75 between upper end portions of the hook plates for gripping the suspension web 73 against the back of the pads or platens 38.

These supporting cams are releasable in the illustration by channel-shaped trip levers 76 pivoted at 77 over the backs of the hooks and extended forwardly at 78 to engage and lift cams 74 when actuated by pressure on the finger pads 79. In each case, a spring 80 is provided to hold the trip lever 76 in the lower position shown in Figs. 17 and 19.

A second, reversely faced cam 81 pivoted on the hook plates in opposition to cross bar 82 is provided to hold the bracket against upward shifting movement on the suspending web 73.

Figs. 18 and 19 show the cam lifting lever 76 as extending beneath both the handle extensions of cams 74 and 81 to release both these cams when the lever is operated by push handles 79. Consequently, to shift the bracket upwardly or downwardly on the supporting web 73 it is only necessary to operate the cam release lever 76 and then slide the bracket along the web to the desired location where, after release of the lifting lever, it will then be held against downward movement by cam 74 and against upward movement by cam 81.

With this construction the web supported brackets may be adjusted if need be to match the position of the brackets on the stanchion and which latter as previously described may have fixed step position on the stanchion. The continuous or unlimited adjustment of the web brackets is therefore a highly desirable feature enabling them to be set to exactly match the stanchion brackets.

The construction has the advantage of freely receiving and then securely holding the litters. The clamps are normally held in the open position with the hooks fully open and free to receive the litter handles. Then the clamps can be closed to lock the litter at all four corners by simply pulling on the clamp closing straps or webs 35. The cams 37 then grip and hold the clamp closing webs 35 in the clamp closed position, each cam automatically and adjustably holding its clamp properly closed. The resilient pads 30 on these clamps take up wear and effect firm gripping of the litter handles in the hooks.

The litters can be as quickly released by tripping the handles 40 of the clamp closing cams with a touch of the fingers.

By making the hooks of sheet metal hook shaped plates fixedly secured in parallel spaced relation, advantages of strength with lightness are gained, firm gripping of the handles at spaced points is secured and mounting for the clamps between the spaced plates is obtained. Also, this structure lends itself to the mounting of the brackets in many different relations such as those illustrated. The brackets may be fixed to walls, posts, beams or other structure, may be pivoted to swivel one way or the other, or may be suspended from roof, ceiling or other overstanding structure. They may be mounted at fixed elevations or be mounted for vertical adjustment and brackets at one side fixed and the companion brackets vertically adjustable to suit the fixed brackets.

The hooks of companion brackets may be both faced in the same direction as shown in Fig. 1 to enable quick placing and removal of litters, but if found desirable companion brackets may be mounted with the hooks either inwardly or outwardly facing, depending upon the particular circumstances.

In addition to the many advantages such as noted, the brackets are of relatively simple construction and adapted to be produced at relatively low cost.

What is claimed is:

1. A litter bracket comprising companion hook plates having open hooks, connecting and spacing pins securing said hook plates in spaced parallel relation, means connected with said hook plates for supporting them with said open hooks in upwardly faced position for reception of a litter handle, an inverted channel shaped lever pivoted on one of said pins at a point above said open hooks, a coil spring on said pin urging said lever upwardly away from said open hooks, a resilient pad in the channel portion of said lever at the underside of said lever positioned for engagement with a litter handle seated in said open hooks, handle means connected with said lever for manually closing the same downwardly to an adjustable extent into yielding, holding and gripping engagement with a litter handle seated in said open hooks and quick releasable manually operable means for securing said clamp lever in downwardly adjusted litter handle holding position and whereby on manual release of the same said lever will be swung upwardly clear of holding engagement with the litter handle.

2. A litter bracket comprising companion hook plates having open hooks, connecting and spacing pins securing said hook plates in spaced parallel relation, a clamp lever pivotally mounted on one of said pins in position above said open hooks and movable downwardly to engage a litter handle supported in said open hooks and means connected with said hook plates for adjustably supporting them with said open hooks in upwardly faced position for reception of a litter handle, including a supporting web and reversely faced cams engageable with said web for securing the bracket against movement in opposite directions on the web, said reversely acting cams having projecting handle levers by which either cam may be released to permit movement of the bracket on the web in one direction or the other, and a common release lever pivoted on the bracket in position to engage the handle levers of both cams and whereby both cams may be simultaneously released to permit free movement of the bracket on the web in both directions.

References Cited in the file of this patent

UNITED STATES PATENTS

| | | |
|---|---|---|
| 1,219,045 | Schmidt | Mar. 13, 1917 |
| 2,315,196 | Gallione | Mar. 30, 1943 |
| 2,404,531 | Robertson | July 23, 1946 |
| 2,442,266 | Davis | May 25, 1948 |
| 2,665,431 | Elsner | Jan. 12, 1954 |

FOREIGN PATENTS

| | | |
|---|---|---|
| 112,852 | Sweden | Jan. 2, 1945 |